United States Patent [19]

Kartchner et al.

[11] Patent Number: 4,676,518
[45] Date of Patent: Jun. 30, 1987

[54] MOTORCYCLE FRONT FORK DUST COVER

[76] Inventors: Niles R. Kartchner, 1139 S. State St., Salt Lake City, Utah 84111; Joe D. McClellan, 7923 Thornton Cir., Sandy, Utah 84092

[21] Appl. No.: 807,536
[22] Filed: Dec. 11, 1985
[51] Int. Cl.⁴ .................................. B62K 25/04
[52] U.S. Cl. .................... 280/276; 188/322.12; 277/29; 277/237 A; 277/DIG. 4
[58] Field of Search ............ 180/219; 280/276; 188/322.12; 277/177, 29, DIG. 4, 237 A

[56] References Cited

U.S. PATENT DOCUMENTS

| 2,360,734 | 10/1944 | Smith | 277/177 |
| 4,367,882 | 1/1983 | Alexander | 280/276 |
| 4,479,662 | 10/1984 | Defour et al. | 280/281 R |
| 4,573,697 | 3/1986 | Schier | 280/276 |

FOREIGN PATENT DOCUMENTS 90594 3/1959 Netherlands ............ 280/276

Primary Examiner—John A. Pekar
Attorney, Agent, or Firm—Trask, Britt & Rossa

[57] ABSTRACT

A dust cover adapted for sealing the opening extant between a fork tube and its attendant fork slider on a telescopic motorcycle fork assembly is disclosed. The cover includes a casing fabricated from materials which are resistant to the environment. The casing is mounted on an end of the slider and includes an interior channel dimensioned to slidably receive a portion of the fork tube which extends outward from that slider. The casing is fitted with a sealing means which extends into the interior channel and abuts against the fork tube so as to form a tight seal.

14 Claims, 6 Drawing Figures

MOTORCYCLE FRONT FORK DUST COVER

BACKGROUND OF THE INVENTION

1. Field

This invention is directed to dust covers adapted for positioning on the front fork assemblies of conventional motorcycles. More particularly, this invention is concerned with the sealing of telescopic fork tubes which make up a motorcycle front fork assembly.

2. Statement of the Art

Motorcycles and variations thereof are common and well-known in the art. In a typical construction, a motorcycle consists of a frame which is connected to two wheel support assemblies which extend from essentially opposite ends of the frame to wheel-bearing axles.

The front wheel assembly or front fork assembly may entail a variety of structural configurations. Of the known configurations, that known as a telescopic fork assembly is the most common. A telescopic fork assembly consists essentially of two parallelly oriented fork tubes or stanchions which are fixedly mounted on the frame and extend outwardly therefrom. Positioned on the lower end of each fork tube is a fork slider which, during operation of the motorcycle, is caused to move up and down on the tubes in response to road irregularities.

The fork tube assembly utilizes a spring arrangement in order to absorb shocks rendered to the motorcycle as it travels over the road. In a conventional construction, these springs are positioned within the fork tube, as well as within the fork slider. When the front fork strikes a bump in the road, the fork sliders are moved upward along the accompanying fork tube. This upward motion operates to compress the spring. When the force on the slider is released, the spring operates to forcefully return the slider to its original position. In order to avoid a rapid or sudden return of the fork slider to its original position, a dampening system is positioned within the slider/fork tube assembly.

Damper units are constructed in a variety of designs and configurations. A conventional construction utilizes a fluid medium, generally oil, which is contained within a reservoir housed in the fork tube assembly. Upon striking an irregularity in the road, the springs are compressed and, at the same time, oil is forced through a number of orifices in the damper mechanism. Upon the force being released on the fork slider, the springs operate to return the slider to its original position, requiring the oil to be siphoned back through the orifices as the slider moves down the fork tube. The resistance provided by the oil flow serves to dampen or restrict any sudden or violent extension of the slider under the action of the compressed spring.

Fork tubes are commonly hard-chromed and typically provide for an oil seal to be positioned substantially at the uppermost portions of the fork slider/fork tube assembly. This oil seal contacts or abuts against the fork tube, serving to confine the oil reservoir within the confines of the fork slider. To insulate the oil seal from contaminants, such as dirt or dust generated exterior of the fork tube assembly, a conventional practice requires the placement of a dust shield or rubber boot which is configured to be positioned about the upper end of the fork slider so as to insulate the oil seal from the environment.

As shown in FIG. 1, a dust shield typically comprises a molded rubber member having an essentially tubular cylindrical portion surmounted by a truncated, cone-like section. This shield generally includes a hollow, interior channel which is dimensioned so as to be fitted in a snug, embracing fashion over the end of the fork slider. A typical practice includes forming an annular, extension-like ring member within the bottom portion of the dust shield, which member is adapted to be fitted within a groove which is circumferentially configured into the outer surface of the fork slider. The dimension of the interior channel is such that, owing to the resilient or elastic-like properties of the rubber, it is smaller than the cross-sectional diameter of the fork slider, such that the dust shield can be expanded or stretched initially so as to receive the fork slider and thereafter contract, forming a tight, shrink-like fit around the circumference of the upper end of the fork slider.

The truncated, cone-like section of the dust shield also includes an interior channel which has a smaller diameter than the diameter of the cylindrical-shaped portion of the dust shield. This smaller diameter more closely corresponds to the diameter of the fork tube. The truncated, cone-like section adapts for positioning its interior walls in close abutment with the fork tube so as to essentially seal the opening or annular-like region which separates the fork tube and the fork slider tube.

The conventional dust shield is fabricated from rubber in view of the resilient and elastic-like properties of that material and its ability to form a substantially tight fitting seal against the fork tube and fork slider. Owing to the outdoor use of motorcycles, the rubber is exposed to the environment, and especially to the ultraviolet radiation of sunlight. These environmental factors, accompanied with the exposure to cold and heat during the varying seasons of the year, cause the rubber dust shield or boot to be subject to deterioration over time. Noticeably, the cover becomes brittle, fails to properly abut and provide a sealing action against the fork tube and/or fork slider. Eventually, after extended use, the cover ceases to render the proper dust insulating function for which it was designed.

Owing to the construction of the motorcycle, the installation of the dust shield requires essentially the complete disassembly of the front fork assembly. Noticeably, this requirement operates to disincentivize a user from making a proper and timely replacement of the shield. Absent a proper replacement of the dust shield, environmental particulates, especially dust, may thereafter be introduced through the oil seal into the oil reservoir. The contaminated oil fails to render the proper functioning and serves to complicate, if not preclude, proper operation of the slider dampening mechanism.

Of recent introduction is the use of a plated steel jacket-like member which, in exterior configuration, essentially imitates the outer configuration of the dust shield. In FIG. 1, a typical jacket is shown positioned superior to the rubber boot in the exploded view. This jacket member is configured so as to be fitted over the rubber boot and thereby insulate the boot from exposure to the environment. In other words, this jacket permits extended use life for the rubber boot in that it is substantially insulated from ultraviolet radiation or other environmentally deteriorative factors. Recognizably, the use of this jacket serves to add another component to the motorcycle assembly, and thereby increases the cost as well as the ease of maintenance and replacement of the dust shield.

SUMMARY OF THE INVENTION

A dust cover for use in a motorcycle front fork tube assembly is disclosed. The invention is directed for use in a telescopic front fork assembly which includes a fork slider having a portion thereof which is slidably embraced within a fork tube.

The dust cover of the invention is adapted for positioning upon the upper end of the slider tube so as to embrace and seal the annular-like opening which separates the slider tube and the fork tube. The dust cover includes a rigid-like casing which is fabricated from an environment-resistant material, e.g. die-cast zinc, stainless steel, aluminum or hard plastic. The casing is essentially tubular in construction and defines an interior wall which interior wall includes an interior, open-ended channel.

A first portion of that channel is dimensioned to have a cross-section and/or diameter which essentially corresponds to the outer cross-sectional diameter of the fork slider. This portion of the interior channel is adapted to receive an open end of the fork slider. Further, the channel is also dimensioned such that, upon its mounting, the portion of the fork tube which extends out of the open-ended fork slider is received within the channel and extends outwardly therefrom.

A second portion of the interior wall defining the interior channel of the casing is fitted with a sealing means which is adapted to form an airtight seal between the interior wall and the exterior surface of the fork tube; i.e., the sealing means is mounted on the interior wall of the casing and extends into the interior channel of that casing so as to abut against the fork tube and thereby form a seal or barrier linking the interior wall and the fork tube.

In a preferred construction, this sealing means includes a conventional "O" ring which is either mounted fixedly against the interior wall or alternately housed within a circumferentially mounted groove defined within the interior wall surface, which groove serves to retain the "O" ring in a set orientation. The "O" ring may be fabricated from rubber, felt or alternately other materials which may provide an essentially airtight sealing function against the fork tube.

The dust shield may be mounted on the fork slider by a variety of methods. An airtight seal may be effected by use of epoxys, cements, glues, or by shrink-fitting. Assuming the obtention of a substantially airtight seal, both against the fork slider and the fork tube, the dust shield may include a vent means. This vent means may be typically defined by an aperture within the surface of the dust shield which extends from the exterior of the dust shield and communicates with the interior channel. The vent functions to release air pressure, which may be developed within the interior channel. The air is vented outwardly through the aperture so as to preclude the obtention of high pressures which may either preclude the functioning of the fork tube or alternately destroy its components.

DESCRIPTION OF THE ILLUSTRATED EMBODIMENTS

Figure 4:
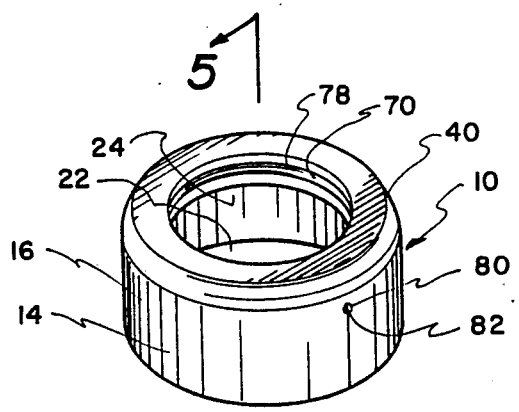
FIG. 4 is an elevational, perspective view of the dust shield of the instant invention detailing the positioning or placement of the sealing means and the vent means.
Figure 5:
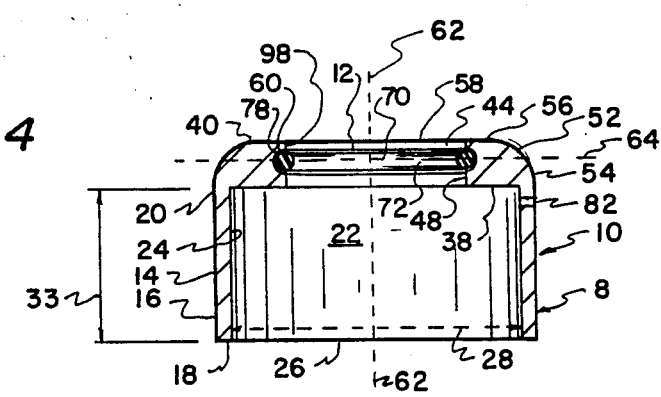
FIG. 5 is a cross-sectional view of the dust cover shown in FIG. 4 along sectional lines 5—5.

As shown in FIGS. 4 and 5, a dust cover or shield 8 of the instant invention includes a casing member, generally 10, fitted with a sealing means, generally 12. Casing member 10 generally includes two distinct identifiable portions.

A first portion 14 is essentially tubular in construction having an open-ended, essentially cylindrical-like exterior configuration. Casing portion 14 includes an essentially upright outer wall 16 which extends between opposing ends 18 and 20. Casing 10 defines an inner channel 22 which is essentially cylindrical in configuration and is defined by the interior wall 24 of casing 10. The interior wall 24 is essentially annular or cylindrical in configuration. Casing 10 includes an open end or access port 26 positioned proximate end 18 of the upright wall 16. Access port 26 includes a diameter 28 which corresponds and is only slightly larger than the outer diameter 30 of fork slider 32. Further, the diameter of access port 26 is essentially equivalent to the diameter of that portion of channel 22 proximate access port 26. The diameter of channel 22 is essentially constant over height 37 of the first portion 14 of the casing 10. The constant diameter permits the dust cover 8 to be fitted over the open end 34 of fork slider 32. When installed, the upper edge 36 of the fork slider 32 is within the proximity of the end 20 of the casing portion 14. Further, edge 36 is positioned in abutment against the lower surface 38 of the second portion 40 of the casing 10.

Figure 6:
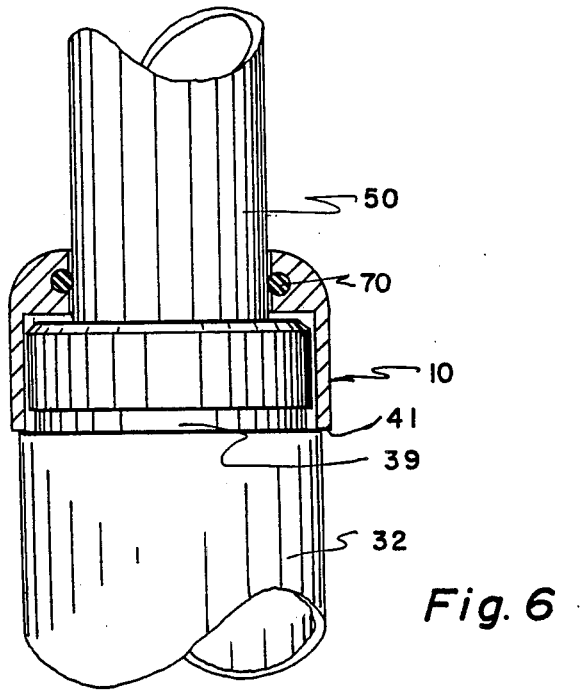
FIG. 6 is a cross-sectional view of the dust cover of the instant invention mounted on a fork tube assembly.

As shown in FIG. 6, a typical fork slider construction 32 includes a shoulder or ledge-like region, generally 39, which extends generally circumferentially about the exterior surface 31 of slider 32. This shoulder region 39 defines a generally planar support surface 41. The end 18 of the casing portion 14, upon positioning of the casing 10 over slider 32, may be abutted against support surface 41 so as to stabilize and support the casing 10. Alternately, casing 10 may be entirely supported by the abutment of edge 36 against lower surface 38 of casing 10.

The dimension or configuration of the channel 22 permits the user to apply a minimum of glue, epoxy, or other adhesive material either along the interior wall 24 of the casing 10 or aternately along the portion 42 of exterior 31 of slider 32. Upon placement of casing 10 over fork slider 32, a substantially airtight and fixed mounted of the casing 10 on the fork slider 32 is achieved, thereby prohibiting air from entering between the wall 24 of the casing 10 and the exterior surface 31 of fork slider 32.

Alternately, the casing 10 may be shrunk-fit about the portion 25 of fork slider 32 so as to achieve the same airtight fitting.

Fixedly mounted upon the upper regions proximate the end 20 of the first portion 14 of casing 10 is the second portion 40 of casing 10. As shown in FIG. 5, portion 40 is adapted to present an interior channel 44 having a constant cross-sectional area or diameter which may be significantly smaller than that of channel 22. Channel 44 in conjunction with channel 22 defines a channel which extends throughout the interior of the casing 10. The channel 44 as defined by the second portion 40 of the casing 10 is dimensioned to have approximately the same cross-sectional area or diameter as the outer diameter 46 of the portion of the fork tube 50 which extends outwardly from the interior of the fork slider 32 and which is made slidable about the region of the fork slider 32 occupied by the dust cover 8.

Casing portion 40 includes interior wall 48, which is linear and upright, and which defines an essentially cylindrical channel 44. Channel 44 includes a diameter which is slightly larger than the outer diameter 46 of fork tube 50. In a preferred embodiment, channel 44 includes a diameter which is between approximately 0.008 and 0.012 inches larger than the diameter 46 of fork tube 50. Channel 44 may be essentially constant in diameter over its total length.

The outer surface 52 of portion 40 of casing 10 may be adapted with a variety of configurations, most of which may be aesthetically, as opposed to functionally, inspired. For example, as shown in FIG. 5, the exterior regions of portion 40 of casing 10 may include a curvalinear portion 54 supplanted by an essentially planar upper end surface 56 which terminates about the circumference of an open port 58, which port 58 connects with channel 44 and permits the fork tube 50 to extend through the dust cover 8. Port 58 includes a diameter which may be essentially equivalent to the diameter of channel 44.

In a preferred embodiment, as shown in FIGS. 4 and 5, the interior wall 48 is adapted with a groove-like indentation 60, which as shown may be substantially semicircular in crosssection and which extends essentially about the total circumference or perimeter of interior wall 48. Further, groove 60 is essentially oriented about an axis 64 which is perpendicular to the longitudinal axis 62 of the casing 8; i.e., axis 64 is perpendicular to axis 62.

Fitted within the semicircular cross-sectioned groove 60 is a sealing means 12, which as shown may include an "O" ring 70 configured to be slidably received within groove 60 and retained therein by the configuration of groove 60. The "O" ring 70 may be fabricated from a variety of materials, including felt, rubber, or other conventionally known material. The "O" ring 70 includes an inner diameter 72 which is dimensioned to be slightly smaller than the outer diameter 46 of fork tube 50, whereupon an insertion or positioning of the dust cover 8 in its proper orientation about the end 36 of fork slider 32, and further in abutment against the region 74 of fork tube 50, the edge or interior facing surface 78 of the "O" ring 70 is brought into a tight abutting relationship with fork tube 50, whereupon a tight seal is thereby effected.

Figure 1:
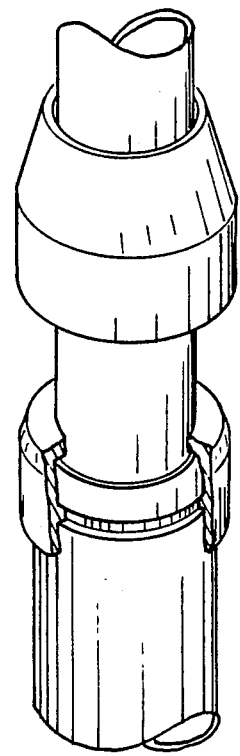
FIG. 1 is an elevational, perspective view of a dust cover or shield of the prior art fixedly mounted upon a fork tube assembly.
Figure 2:
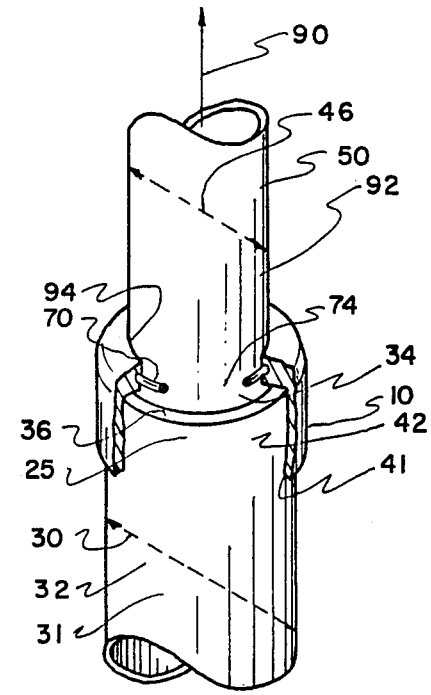
FIG. 2 is an elevational, perspective view of a fork tube assembly fitted with a dust shield of the instant invention- showing a cut-away portion of the shield illustrating the placement of an "O" ring sealing means.
Figure 3:
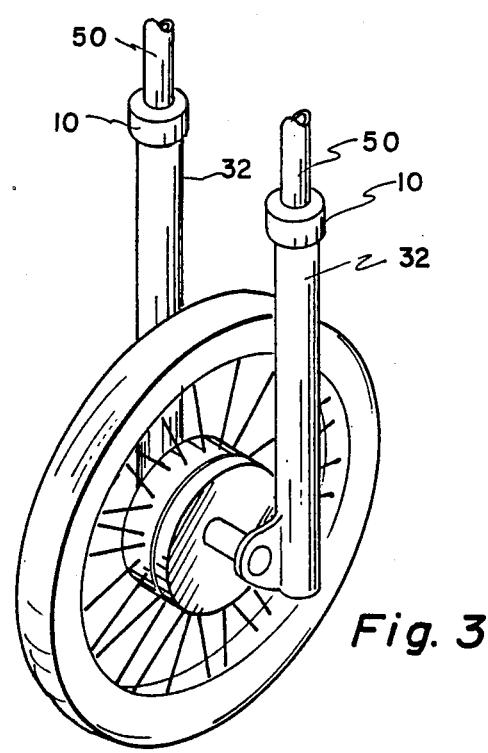
FIG. 3 is an elevational, perspective view of a front fork assembly having fitted thereon a dust cover or shield serving to seal the fork tubes and the fork sliders.

As may be noted from the drawings, especially FIGS. 2, 4 and 5, the rubber "O" ring or sealing means of the invention is essentially insulated from contact or exposure to the environment in that the casing 10 in association with the fork tube 50 and fork slider 32 essentially surrounds the sealing means. Ultraviolet radiation, together with water or other debris, is essentially kept from contacting the sealing means 70.

In those orientations wherein the casing 10 obtains an airtight seal against wall 42 of fork slider 32 and against region 74 of fork tube 50, the casing 10 may be fitted with a vent means 80 which is adapted to release air pressure which may be generated within channel 22 or channel 44 due to the action of the fork tube 50 within the fork slider 32, i.e. their oscillatory motion with respect to one another. This vent means 80 may be generally an aperture 82 which extends from outer wall 16 of casing 10 through casing portion 14 to communicate thereby with interior channel 22 such that any air pressure developed within channel 22 or channel 44 may be released through aperture 82.

As shown in FIGS. 4 and 5, aperture 82 is generally configured within the upright, essentially cylindrical wall 16 of that portion 14 of casing 10.

Casing 10 may be fabricated from a variety of materials. Foremost among the considerations in choosing these materials are their ability to be resistant to both ultraviolet radiation and extremes in temperature (cold and heat). Among the materials which are desirable are aluminum, die-cast zinc, plastic, brass, stainless steel, and plated steel.

The dust cover of the instant invention is mounted by first disassembling the fork tube assembly, i.e. separating the fork tube 50 from its attendant fork slider 32. Casing 10 is then slidably inserted on fork tube 50, i.e. fork tube 50 is inserted into channels 22 and 44 of casing 10, whereupon fork tube 50 is then inserted into fork slider 32. The interior wall 24 of portion 14 of casing 10 is thereafter coated with an adhesive such as silicon rubber glue, rubber cement, or epoxy. Alternately, the adhesive may be spread over extension portion 42 of slider 32. The casing 10 thereafter slides down fork tube 50 and fits over end 36 of fork slider 32 whereby interior wall 24 is brought into proximity or abutment against wall portion 42 of fork slider 32, bringing end 34 of fork slider 32 into an abutment against the surface 38 of portion 40 of casing 10. Further, end 18 of casing portion 14 may be brought into abutment against shoulder 39 and surface 41 of slider 32. Upon the curing of the adhesive, vent aperture 82 is cleared of obstructions, e.g. excess adhesive. In practice, a common straight pin has been shown to be effective in this regard. "O" ring 70 may then be lubricated. The fork tube 50 is thereafter inserted through channel 44 of casing 10 and the fork tube assembly essentially reconstructed. To ensure proper alignment, fork tube 50 must be assembled to fork slider 32.

In operation, as the motorcycle is driven along the road, irregularities in the road cause the fork slider 32 to be driven upwardly in the direction indicated by arrow 90 along the exterior surface 92 of fork tube 50, whereby the sealing means 12, which as shown may include the "O" ring 70, form a tight sealing relationship against the exterior surface 92 of the fork tube 50, serving thereby to preclude entrance of contaminants which may be introduced through the opening 94 extant between the interior wall 48 and the exterior surface 92 of fork tube 50.

Those skilled in the art will recognize that the embodiments hereinbefore discussed are illustrative of the general principals of the invention. The embodiments herein described are not intended to limit the scope of the claims, which themselves recite what applicant regards as his invention.

I claim:

1. A dust sealing system for use on the front fork tube assembly of motorcycles having a circular cross-sectioned fork tube which extends into a tube slider, said system comprising:

a tubular, open-ended casing fabricated from an environmentally resistant material, an end of said casing being fixedly mounted on an end of said fork slider to form an airtight seal, said casing having an interior wall defining a circular cross-sectioned, first channel therein which slidably receives a portion of a fork tube extending from said fork slider, the positioning of said casing about said fork tube defining a substantially annular opening therebetween, said casing having an annular second channel defined within said casing interior wall; and a sealing means fixedly and sealingly mounted to said interior walls of said casing within said second channel whereby said sealing means extends into said first channel and abuts against said fork tube and seals said opening, said sealing means comprises a felt "O" ring dimensioned sufficiently to effect a seal of said opening.

2. The dust sealing system according to claim 1 wherein said casing is metallic.

3. The dust sealing system according to claim 2 wherein said casing is fabricated from aluminum.

4. The dust sealing system according to claim 2 wherein said casing is fabricated from die-cast zinc.

5. The dust sealing system according to claim 1 wherein said casing is glued on said end of said fork slider.

6. The dust sealing system according to claim 5 wherein said casing is mounted on said fork slider by epoxy.

7. The dust sealing system according to claim 1 wherein said casing is mounted on said fork slider by shrink fitting.

8. A dust sealing system for use on the front tube assembly of motorcycles having a circular cross-sectioned fork tube which extends into a tube slider, said system comprising:

a tubular, open-ended casing fabricated from an environmentally resistant material, an end of said casing being fixedly mounted on an end of said fork slider to form an airtight seal, said casing having an interior wall defining a circular cross-sectioned first channel therein which slidably receives a portion of a fork tube extending from said fork slider, the positioning of said casing about said fork tube defining a substantially annular opening therebetween, said casing having an annular second channel defined within said casing interior wall; and a sealing means fixedly and sealingly mounted to said interior walls of said casing within said second channel whereby said sealing means extends into said first channel and abuts against said fork tube and seals said opening, said sealing means comprises a rubber "O" ring dimensioned sufficiently to effect an airtight seal of said opening;

wherein said casing defines an aperture therein which communicates said first channel with an exterior wall of said casing.

9. The sealing system of claim 8 wherein said casing is metallic.

10. The sealing system of claim 9 wherein said casing is fabricated from aluminum.

11. The sealing system of claim 9 wherein said casing is fabricated from die-cast zinc.

12. Ihe sealing system of claim 8 wherein said casing is glued on said end of said fork slider.

13. The sealing system of claim 8 wherein said casing is mounted on said fork slider by epoxy.

14. The sealing system of claim 8 wherein said casing is mounted on said fork slider by shrink fitting.

* * * * *